United States Patent
Watwood et al.

(10) Patent No.: US 9,724,253 B2
(45) Date of Patent: Aug. 8, 2017

(54) FOOT OPERATED MECHANICAL STEERING SYSTEM FOR A MANUAL WHEELCHAIR

(71) Applicants: Brian M. Watwood, Roseville, CA (US); Christopher A. Zikry, Porter Ranch, CA (US); Marcel T. Bernucci, Davis, CA (US); Dat T. Ho, San Jose, CA (US); Phuong V. Dang, Sacramento, CA (US); Steven Andrew Lucero, Sacramento, CA (US)

(72) Inventors: Brian M. Watwood, Roseville, CA (US); Christopher A. Zikry, Porter Ranch, CA (US); Marcel T. Bernucci, Davis, CA (US); Dat T. Ho, San Jose, CA (US); Phuong V. Dang, Sacramento, CA (US); Steven Andrew Lucero, Sacramento, CA (US)

(73) Assignee: Brian M. Watwood, Roseville, CA (US)

( * ) Notice: Subject to any disclaimer, the term of this patent is extended or adjusted under 35 U.S.C. 154(b) by 0 days.

(21) Appl. No.: 15/290,974

(22) Filed: Oct. 11, 2016

(65) Prior Publication Data
US 2017/0189251 A1    Jul. 6, 2017

Related U.S. Application Data

(60) Provisional application No. 62/203,684, filed on Aug. 11, 2015.

(51) Int. Cl.
  *B62B 11/00*   (2006.01)
  *A61G 5/10*    (2006.01)
  *A61G 5/02*    (2006.01)

(52) U.S. Cl.
  CPC ............ *A61G 5/1051* (2016.11); *A61G 5/026* (2013.01); *A61G 2203/10* (2013.01)

(58) Field of Classification Search
  CPC ......................... A61G 5/1051; A61G 2203/10
  (Continued)

(56) References Cited

U.S. PATENT DOCUMENTS

| 79,553 | A | * | 7/1868 | Crandall | .................. | B62M 1/14 |
|---|---|---|---|---|---|---|
| | | | | | | 280/247 |
| 99,166 | A | * | 1/1870 | Crandall | .............. | A61G 7/0528 |
| | | | | | | 280/265 |

(Continued)

*Primary Examiner* — Tony Winner
(74) *Attorney, Agent, or Firm* — Plager Schack LLP

(57) ABSTRACT

A mechanical steering system for a wheelchair to permit a user's foot to pivotably adjust a pair of caster wheels of the wheelchair is provided. The system includes a platform coupled to a frame of the wheelchair, a foot controller assembly pivotably mounted to the platform and having a foot plate to receive the user's foot and a rod coupled to the foot plate, a drag linkage member coupled to the rod of the foot controller assembly, and a pair of lever arm assemblies pivotably mounted to the drag linkage member, each lever arm assembly having a lever rod coupled to a fork member, the fork member being coupled to one of the caster wheels. Pivotable movement of the foot plate is transferred through the drag linkage member to permit both lever rods of the lever arm assemblies to pivot, thereby enabling simultaneous pivotal adjustments of the caster wheels.

10 Claims, 6 Drawing Sheets

(58) Field of Classification Search
USPC .......................................................... 280/265
See application file for complete search history.

(56) References Cited

U.S. PATENT DOCUMENTS

| | | | | |
|---|---|---|---|---|
| 102,423 | A | * | 4/1870 | Nislosduff ............. B62M 25/08 280/238 |
| 3,017,199 | A | * | 1/1962 | Sechrist ................... A61G 5/10 280/269 |
| 3,388,926 | A | * | 6/1968 | Bardsley ................. A61G 5/10 280/265 |
| 3,810,658 | A | * | 5/1974 | Weimer, Sr. ......... A61G 5/1051 280/250.1 |
| 4,241,932 | A | * | 12/1980 | Hartmann ................ A61G 5/10 280/265 |
| 4,515,362 | A | * | 5/1985 | Lin .......................... B62K 9/02 280/243 |
| 4,586,723 | A | * | 5/1986 | Nabinger ................ A61G 5/10 280/250.1 |
| 5,273,304 | A | | 12/1993 | Berkheimer |
| 6,092,822 | A | * | 7/2000 | Salmon ................. A61G 5/023 280/250.1 |
| 2004/0074680 | A1 | | 4/2004 | Brendel |
| 2005/0236208 | A1 | | 10/2005 | Runkles |

* cited by examiner

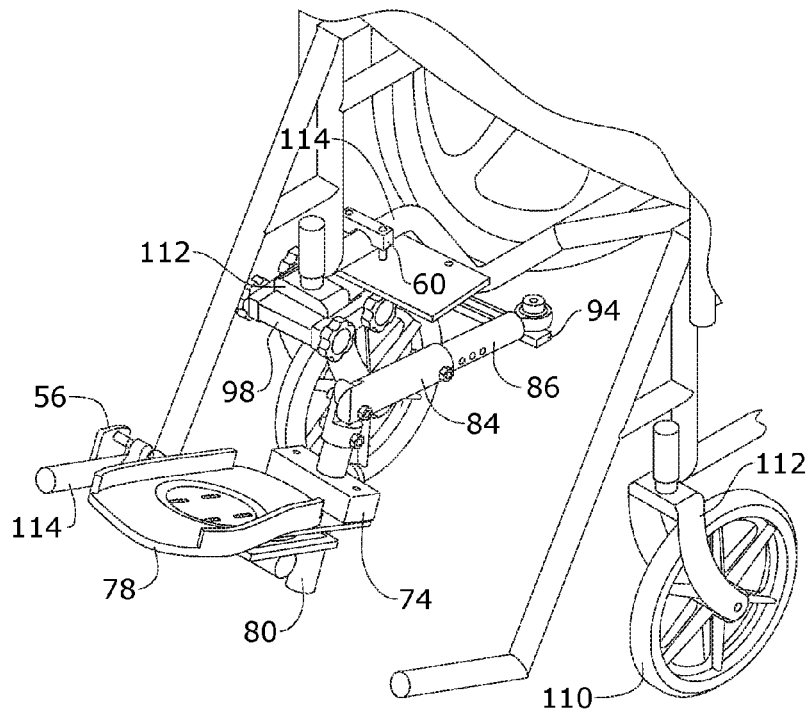
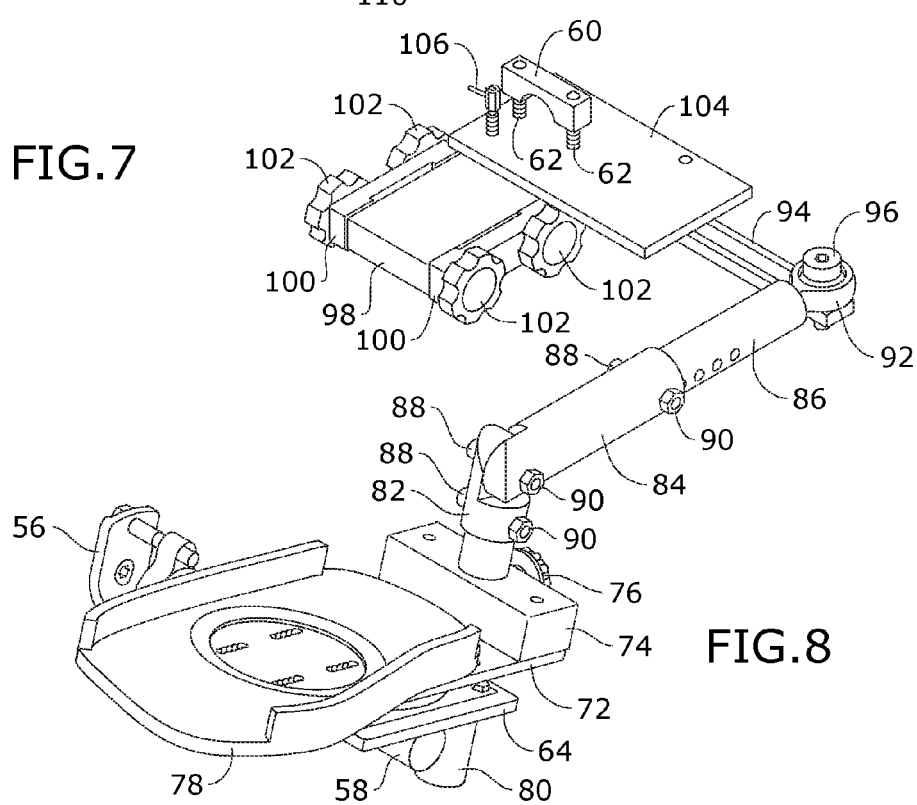
FIG.7
FIG.8

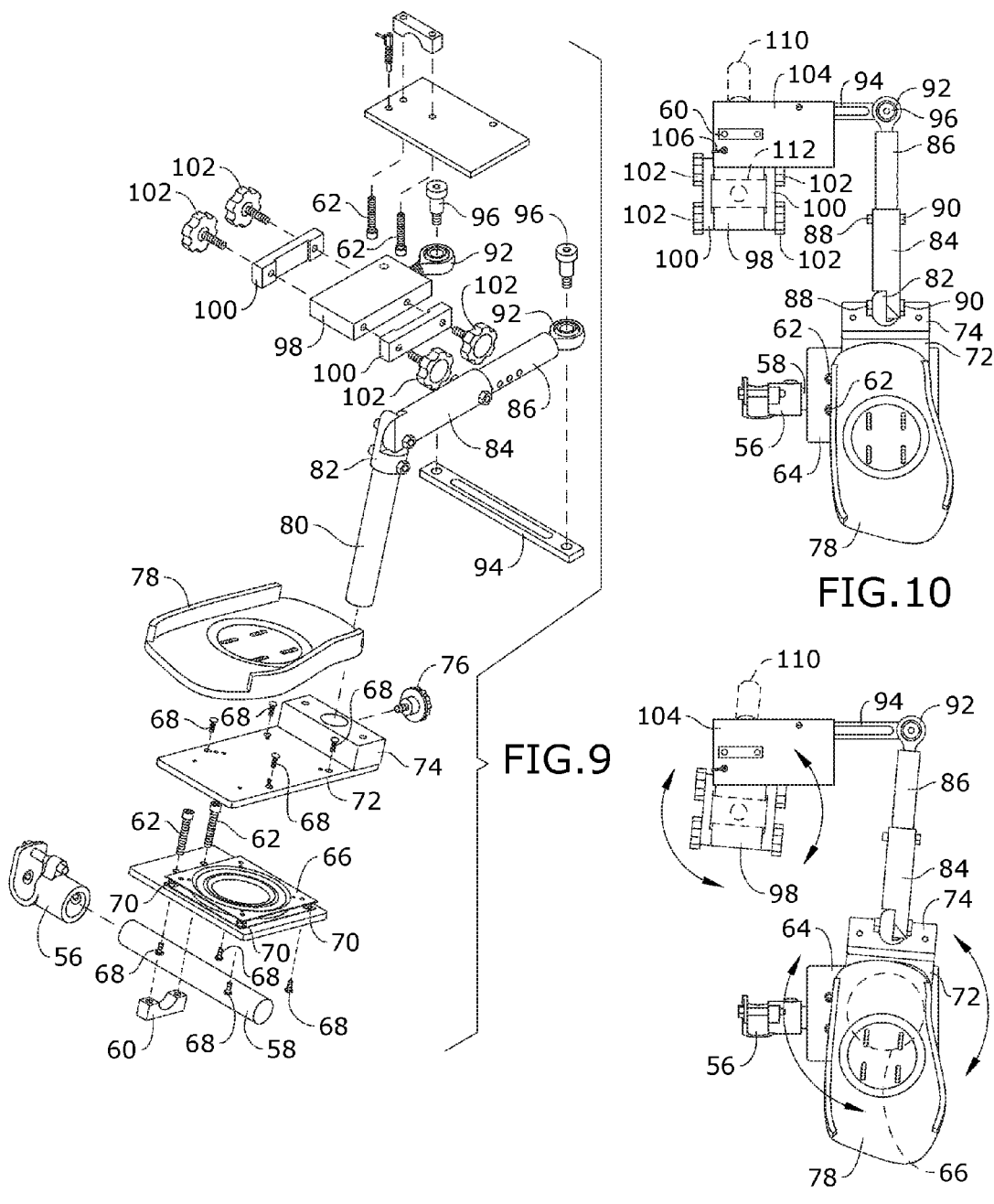

FOOT OPERATED MECHANICAL STEERING SYSTEM FOR A MANUAL WHEELCHAIR

RELATED APPLICATION

The application claims priority to provisional patent application U.S. Ser. No. 62/203,684 filed on Aug. 11, 2015, the entire contents of which is herein incorporated by reference.

BACKGROUND

The embodiments herein relate generally to standard manual wheelchairs.

Wheelchairs are used primarily by individuals who have a difficult time walking due to an illness, injury or disability. Most manual wheelchairs are comprised of a pair of rear drive wheels and a pair of passive caster wheels in the front. The occupant rotates the rear wheels by hand to propel, steer or stop the wheelchair. Currently, hemiplegic and one-armed patients do not have safe and effective directional control when attempting to operate the standard manual wheelchair.

Several wheelchair steering devices are disclosed in U.S. Pat. Nos. 4,241,932, 3,388,926 and 3,810,658. However, these steering devices have many limitations. In particular, U.S. Pat. Nos. 4,241,932 and 3,388,926 disclose a pivotable foot member or turntable coupled to a caster wheel by linking members. Adjustments of the foot member or turntable steer the caster wheel. The other caster wheel is not connected to the steering device and is free-floating, which is problematic when this caster wheel becomes caught on an obstruction such as a rock, twig, branch, or the like. U.S. Pat. No. 3,810,658 discloses a wheelchair steering apparatus that is connected to both caster wheels. However, this device is difficult to use. In particular, the caster wheels are directly steered by lateral movement of a leg rest designed to accommodate the underside of the user's knee. This is problematic because the user's lateral movement of one leg on the leg rest is restricted by the positioning of his/her other leg. As a result, the user's ability to effectively steer the wheelchair's caster wheels is hindered.

As such, there is a need in the industry for an effective directional control system, which enables hemiplegics to safely and effectively operate a manual wheelchair. In particular, there is a need for a foot actuated steering system for manual wheelchairs that allows one-armed operators the option to safely and effectively steer the wheelchair without the help of others while overcoming the limitations of the prior art.

SUMMARY

A mechanical steering system for use with a wheelchair to permit a foot of a user to pivotably adjust a pair of caster wheels of the wheelchair to enhance directional control of the wheelchair when in motion is provided. The mechanical steering system comprises a platform coupled to a frame of the wheelchair, a foot controller assembly pivotably mounted to the platform and comprising a foot plate configured to receive the foot of the user and a rod coupled to the foot plate, a drag linkage member coupled to the rod of the foot controller assembly, and a pair of lever arm assemblies pivotably mounted to the drag linkage member, each lever arm assembly of the pair of lever arm assemblies comprising a lever rod coupled to a fork member, the fork member being coupled to one of the pair of caster wheels, wherein pivotable movement of the foot plate is transferred through the drag linkage member to permit both lever rods of the pair of lever arm assemblies to pivot, thereby enabling simultaneous pivotal adjustments of the caster wheels.

In an alternative embodiment, a mechanical steering system for use with a wheelchair to permit a foot of a user to pivotably adjust a caster wheel of the wheelchair is provided. The alternative mechanical steering system comprises a foot controller assembly coupled to the frame of the wheelchair and comprising a rest plate and a foot plate pivotably mounted to the rest plate, the foot plate configured to receive the foot of the user, an adjustable rod member comprising a first end coupled to the foot plate and a second end pivotably mounted to a drag linkage member, a bracket comprising an end portion pivotably mounted to the drag linkage member, and a pair of clamps detachably coupled to the bracket and configured to secure a fork member within spacing between the pair of clamps and bracket, the fork member being coupled to the caster wheel, wherein pivotable movement of the foot plate is transferred through the drag linkage member to permit both the bracket and pair of clamps to pivot, thereby enabling pivotal adjustments of the caster wheel.

BRIEF DESCRIPTION OF THE FIGURES

The detailed description of some embodiments of the invention will be made below with reference to the accompanying figures, wherein the figures disclose one or more embodiments of the present invention.

FIG. 7 depicts a perspective view of an alternate embodiment of the mechanical steering system shown in use;

FIG. 8 depicts a perspective view of the alternate embodiment of the mechanical steering system;

FIG. 9 depicts an exploded view of the alternate embodiment of the mechanical steering system;

FIG. 10 depicts a top view of the alternate embodiment of the mechanical steering system; and FIG. 11 depicts a top view of the alternate embodiment of the mechanical steering system illustrating pivotable movement of foot plate 72 to turn caster 110.

DETAILED DESCRIPTION OF CERTAIN EMBODIMENTS

Figure 1:
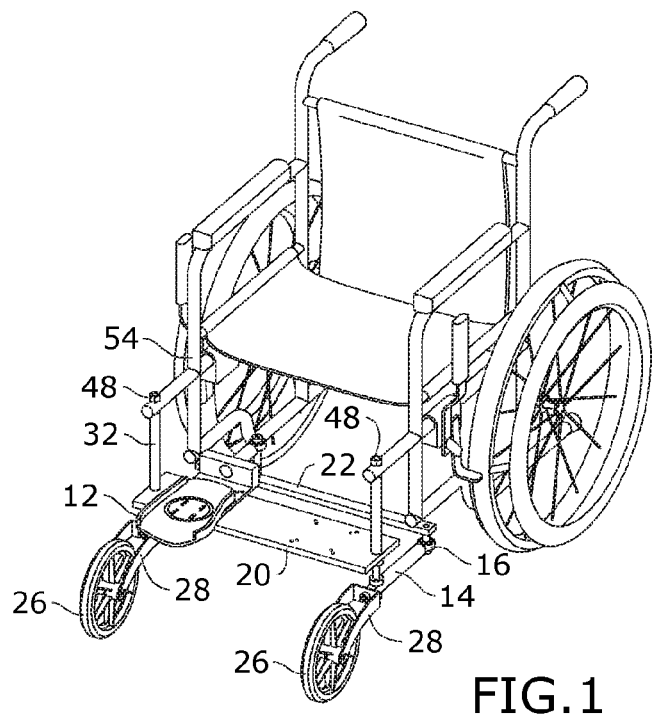
FIG. 1 depicts a perspective view of certain embodiments of the mechanical steering system shown in use.
Figure 2:
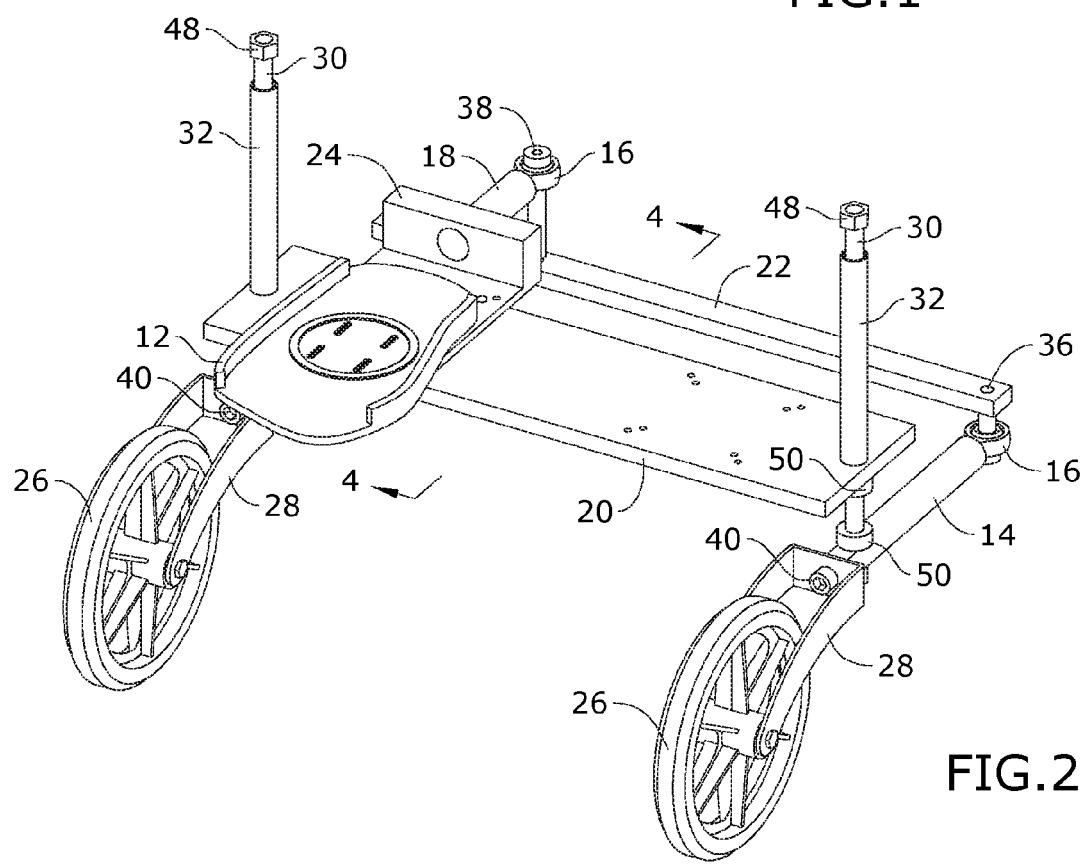
FIG. 2 depicts a perspective view of certain embodiments of the mechanical steering system.

As depicted in FIGS. 1-5, the mechanical steering system is coupled to wheelchair frame 54 and is configured to permit a user (not shown) to simultaneously steer a pair of casters 26 by his/her foot. The mechanical steering system generally comprises platform 20, a foot controller assembly comprising foot binding 12, foot plate 24, foot plate lever rod 18 and foot plate turntable 10, drag linkage 22, and a pair of lever arm assemblies each comprising caster lever rod 14, caster forks 28 and casters 26.

Platform 20 is a generally rectangular plate comprising a pair of openings on opposing sides configured to receive shafts 30. The top end of each shaft 30 comprises a threaded end that is fastened to wheelchair frame 54 by shaft nut 48, which is preferably a hex nut. The bottom end of each shaft 30 comprises a threaded end coupled to caster lever rod 14 of one lever arm assembly by shaft nut 48. Shaft tube 32 is disposed around a central portion of each shaft 30 and configured to contact the top of platform 20. Platform 20 is pressed tightly against both shaft tubes 32 disposed around shafts 30.

Foot plate turntable 10 comprises an upper portion and a lower portion. The lower portion of foot plate turntable 10 is coupled to platform 20 by lower turntable screws 44, which engage with turntable nuts 46. The upper portion of foot plate turntable 10 is rotatably mounted to the bottom portion by a bearing member, and is coupled to foot plate 24 by upper turntable screws 42. Foot plate 24 is a generally L-shaped member comprising an opening to receive foot plate lever rod 18, which is secured thereto by set screw 52. Foot binding 12 is coupled to the top of foot plate 24 and is configured to receive a foot (not shown) of the user. The exposed end of foot plate lever rod 18 comprises rod end 16, which is configured to receive drag linkage shoulder bolt 38. Drag linkage shoulder bolt 38 comprises a threaded bottom end coupled to an opening in drag linkage 22. In an alternative embodiment, foot plate turntable 10, foot plate 24 and foot binding 12 may be coupled to different locations along platform 20 with foot plate lever rod 18 being coupled to different locations on drag linkage 22. This permits foot binding 12 to accommodate the user's left or right foot as desired.

Figure 3:
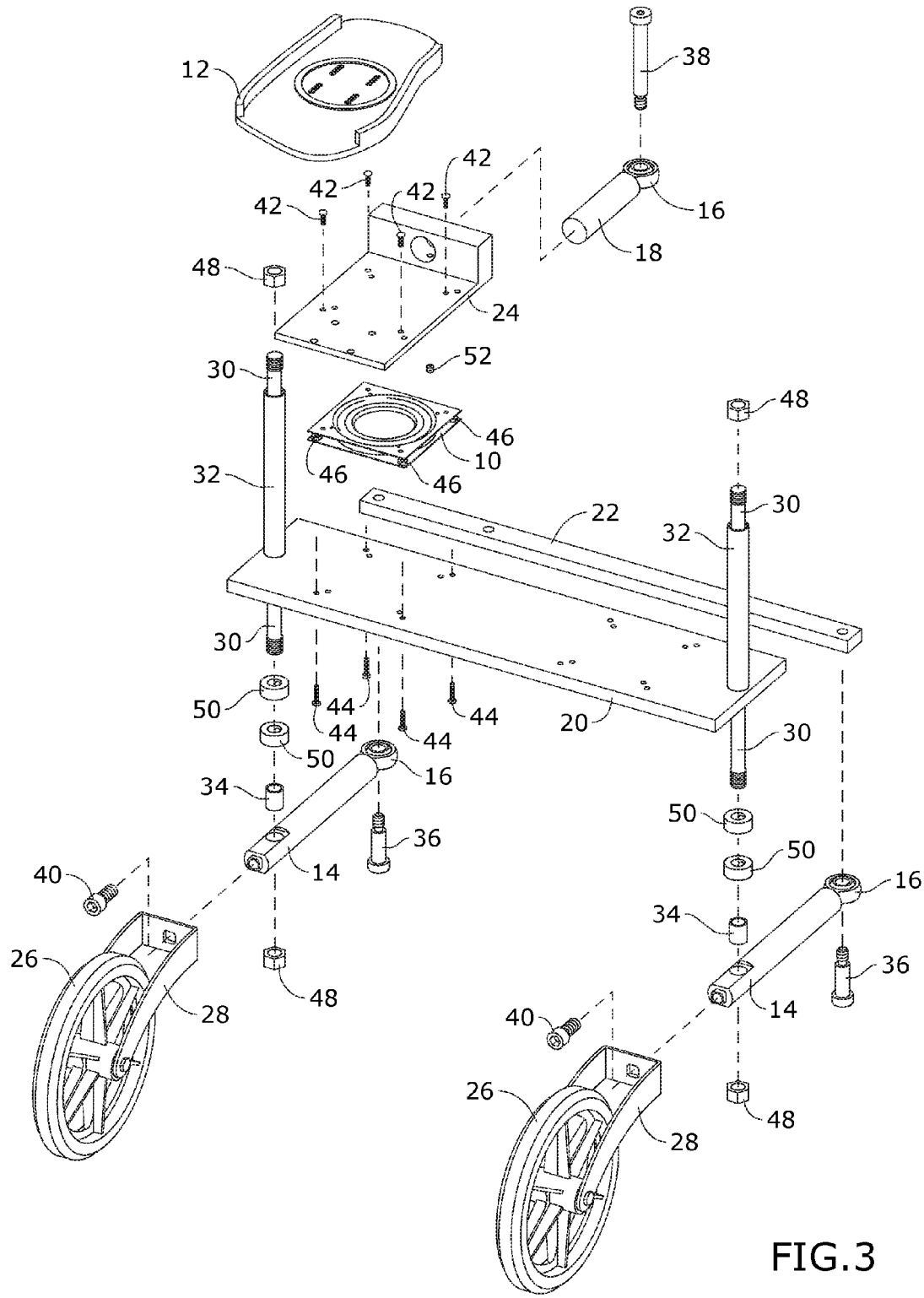
FIG. 3 depicts an exploded view of certain embodiments of the mechanical steering system.
Figure 4:
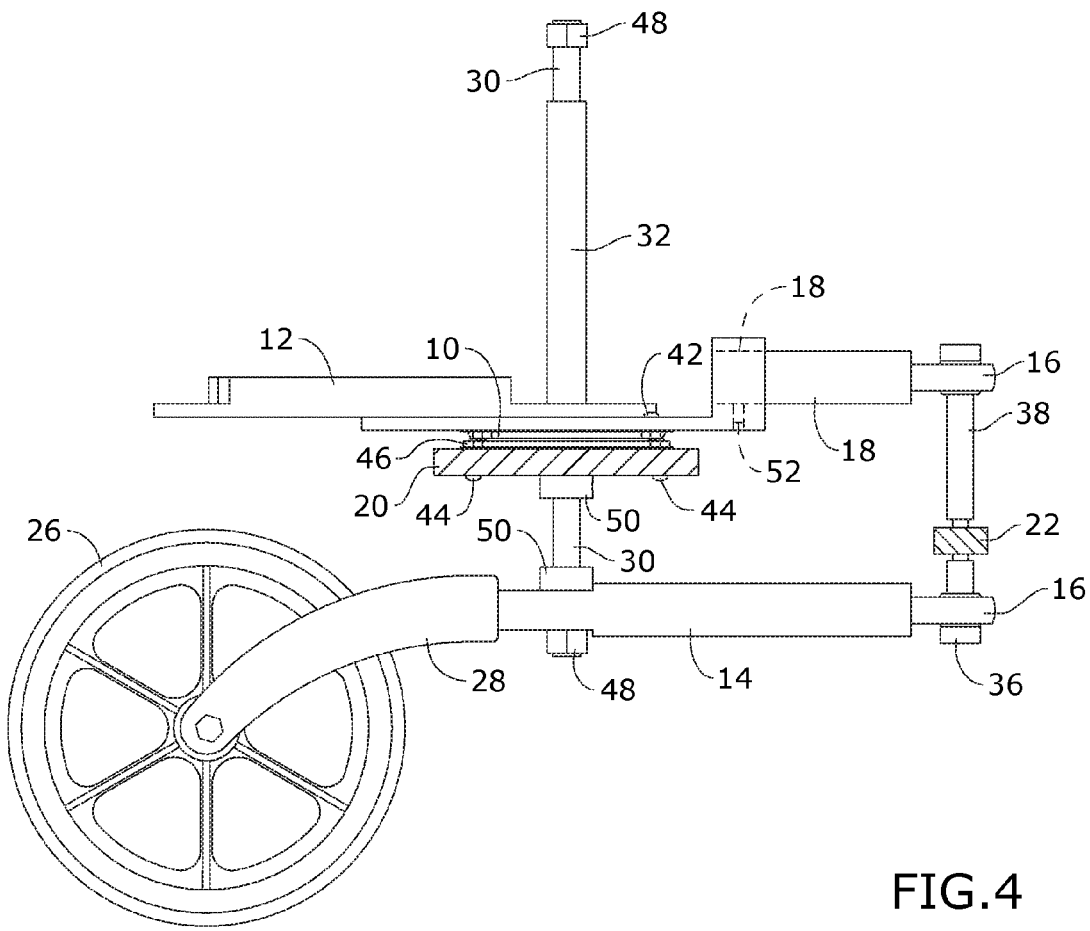
FIG. 4 depicts a section view of certain embodiments of the mechanical steering system taken along line 4-4 in FIG. 2.

The opposing ends of drag linkage 22 are pivotably mounted to the pair of lever arm assemblies. Since both lever arm assemblies are identical, a single lever arm assembly will be described for simplicity. A first end of each caster lever rod 14 comprises rod end 16, which is pivotably mounted to an opening in an end of drag linkage 22 by caster lever shoulder bolt 36. The second end of each caster lever rod 14 comprises an opening configured to receive sleeve bearing 34. Shaft 30 extends through sleeve bearing 34 and is coupled to caster lever rod 14 by shaft nut 48 as depicted in FIGS. 3-4. In certain embodiments, a pair of collars 50 lock platform 20 and tube 32 in place. More specifically, a first collar 50 is disposed around shaft 30 and in contact with platform 20 and a second collar 50 is disposed around shaft 30 and in contact with caster lever rod 14. Each sleeve bearing 34 permits caster lever rod 14 to pivot relative to shaft 30, which is permanently fixed to platform 20 and wheelchair frame 54. The second end of each caster lever rod 14 is also coupled to an opening in caster fork 28 by caster bolt 40. Caster 26 is rotatably mounted to caster fork 28 by an axle.

Figure 5:
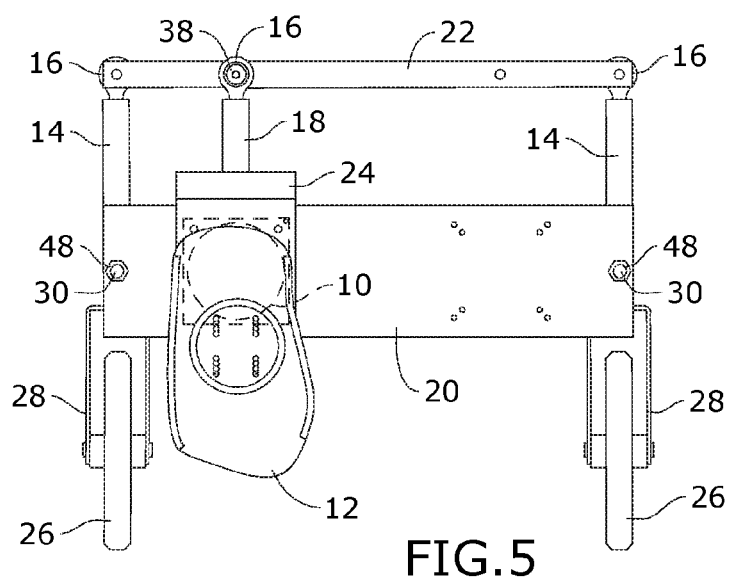
FIG. 5 depicts a top view of certain embodiments of the mechanical steering system.
Figure 6:
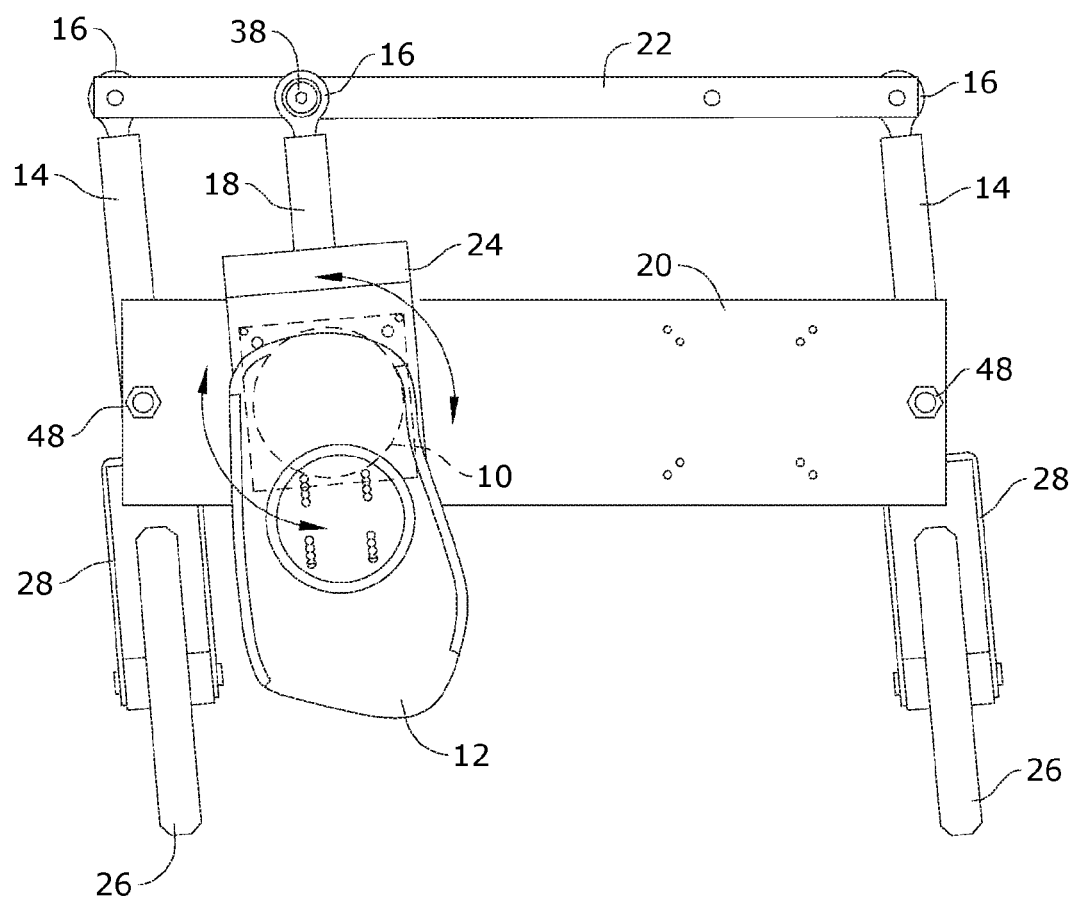
FIG. 6 depicts a top view of certain embodiments of the mechanical steering system illustrating pivotal movement of foot plate 24 to turn casters 26.

In operation, the user sits in the wheelchair and can rest both feet on platform 20. The user operates the wheelchair in a typical fashion known in the field. To steer casters 26, the user places a foot on foot binding 12. Pivotable movement of the user's foot causes foot binding 12 and foot plate 24 to pivot as permitted by foot plate turntable 10. Pivotal movement of foot plate 24 and foot plate lever rod 18 are transferred through drag linkage 22, which causes drag linkage 22 to slide laterally. This motion causes both lever arm assemblies to pivot relative to drag linkage 22. Specifically, each caster lever rod 14 pivots relative to drag linkage 22 at the caster lever shoulder bolt 36 connection. At the same time, each caster lever rod 14 pivots relative to shaft 30 at the sleeve bearing 34 connection. This movement of both caster lever rods 14 of the lever arm assemblies permits casters 26 to pivot simultaneously as shown in FIGS. 5-6. As a result, the user can effectively steer both casters 26 as needed by controlling his/her foot on foot binding 12.

FIGS. 7-11 depict an alternative embodiment of the mechanical steering system configured to steer a single caster 110 of a wheelchair. As depicted in FIGS. 7-9, the alternative mechanical steering system generally comprises a foot controller assembly comprising foot binding 78, foot plate 72 and foot rest plate 64, an adjustable arm assembly comprising column 80, small angled joint 82, large angled joint 84 and joint rod 86, drag linkage 94, and a clamp assembly comprising caster bracket 98 and caster bracket clamps 100.

Foot rest plate 64 is a generally rectangular plate configured to receive turntable 66, which is the same as foot plate turntable 10. Turntable 66 is coupled to foot rest plate 64 by turntable bolts 68, which engage with turntable nuts 70. Slip-rail rod 58 is coupled to the bottom of foot rest plate 64 by tube clamp 60 and tube clamp bolts 62. Rail fitting 56 is coupled to the end of slip-rail rod 58 and wheelchair frame 114.

Foot plate 72 is a generally L-shaped member coupled to turntable 66 by turntable bolts 68 and comprises foot plate block 74. Foot binding 78 is coupled to the top of foot plate 72 and is configured to receive a foot (not shown) of the user. The adjustable arm assembly is coupled to foot plate 72. Specifically, a first end of column 80 is disposed in an opening in foot plate block 74 and secured in place by foot plate knob 76. The second end of column 80 is pivotably mounted to joint rod 86 by small angled joint 82, large angled joint 84 and mechanical fasteners such as joint bolts 88 and joint nuts 90. Joint rod 86 comprises rod end 92 and is slidably mounted to large angled joint 84 in one of a plurality of locking positions. Joint bolts 88 and joint nuts 90 secure joint rod 86 and large angled joint 84 in the desired locking position. The adjustment of joint rod 86 relative to large angled joint 84 permits the adjustable arm assembly to accommodate different sized wheelchairs and/or users.

Drag linkage 94 comprises a first end pivotably mounted to rod end 92 by shoulder bolt 96. The second end of drag linkage 94 is pivotably mounted to the clamp assembly. The clamp assembly comprises a pair of caster bracket clamps 100 detachably coupled to opposing sides of caster bracket 98 by screw knobs 102. Caster fork 112 is secured within spacing between bracket clamps 100 and caster bracket 98 as shown in FIG. 7. Caster bracket 98 further comprises rod end 92, which is pivotably mounted to the second end of drag linkage 94 by shoulder bolt 96.

Pin support plate 104 is coupled to an upper portion of wheelchair frame 114 by tube clamp 60 and tube clamp bolts 62, and caster bracket 98 by plunger 106 as shown in FIGS. 7-8. The securement of the mechanical steering system to both upper and lower portions of wheelchair frame 114 by tube clamp 60 and rail fitting 56 enhances the stability of the system.

In operation, the user operates the wheelchair in a typical fashion known in the field. To steer caster 110, the user places a foot on foot binding 78. Pivotable movement of the user's foot causes foot binding 78, foot plate 72 and the adjustable arm assembly to pivot as permitted by turntable 66. This pivotable movement is transferred through drag linkage 94, which causes drag linkage 94 to slide laterally. As shown in FIG. 11, this motion causes caster bracket 98, caster bracket clamps 100 and caster fork 112 to pivot, thereby enabling caster 110 to pivot. As a result, the user can effectively steer caster 110 as needed by controlling his/her foot on foot binding 78.

It shall be appreciated that the components of the mechanical steering system described in several embodiments herein may comprise any alternative known materials in the field and be of any color, size and/or dimensions. It shall be appreciated that the components of the mechanical steering system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mechanical steering system for use with a wheelchair to permit a foot of a user to pivotably adjust a pair of caster wheels of the wheelchair to enhance directional control of the wheelchair when in motion, the mechanical steering system comprising:
    a platform coupled to a frame of the wheelchair;
    a foot controller assembly pivotably mounted to the platform and comprising a foot plate configured to receive the foot of the user and a rod coupled to the foot plate;
    a drag linkage member coupled to the rod of the foot controller assembly; and
    a pair of lever arm assemblies pivotably mounted to the drag linkage member, each lever arm assembly of the pair of lever arm assemblies comprising a lever rod coupled to a fork member, the fork member being coupled to one of the pair of caster wheels;
    wherein pivotable movement of the foot plate is transferred through the drag linkage member to permit both lever rods of the pair of lever arm assemblies to pivot, thereby enabling simultaneous pivotal adjustments of the caster wheels.

2. The mechanical steering system of claim 1, further comprising a turntable coupled to the platform and comprising an upper portion and a lower portion, the lower portion being coupled to the platform, the upper portion being coupled to the foot plate and rotatably mounted to the lower portion of the turntable.

3. The mechanical steering system of claim 2, further comprising a foot binding coupled to the foot plate.

4. The mechanical steering system of claim 3, further comprising a pair of shafts coupled to the platform, each shaft of the pair of shafts comprising an upper end coupled to the frame of the wheelchair and a lower end rotatably mounted to the lever rod of one of the pair of lever arm assemblies.

5. The mechanical steering system of claim 4, further comprising a tube disposed around a central portion of each shaft in the pair of shafts.

6. The mechanical steering system of claim 5, wherein each shaft of the pair of shafts comprises a first collar coupled thereto and in contact with the platform and a second collar coupled thereto and in contact with the lever rod of one of the pair of lever arm assemblies.

7. A mechanical steering system for use with a wheelchair to permit a foot of a user to pivotably adjust a caster wheel of the wheelchair to enhance directional control of the wheelchair when in motion, the mechanical steering system comprising:
    a foot controller assembly coupled to the frame of the wheelchair and comprising a rest plate and a foot plate pivotably mounted to the rest plate, the foot plate configured to receive the foot of the user;
    an adjustable rod member comprising a first end coupled to the foot plate and a second end pivotably mounted to a drag linkage member;
    a bracket comprising an end portion pivotably mounted to the drag linkage member; and
    a pair of clamps detachably coupled to the bracket and configured to secure a fork member within a spacing between the pair of clamps and bracket, the fork member being coupled to the caster wheel;
    wherein pivotable movement of the foot plate is transferred through the drag linkage member to permit both the bracket and pair of clamps to pivot, thereby enabling pivotal adjustments of the caster wheel.

8. The mechanical steering system of claim 7, further comprising a rail fitting coupled to the rest plate and the frame of the wheelchair.

9. The mechanical steering system of claim 8, further comprising a pin support plate coupled to the bracket and frame of the wheelchair.

10. The mechanical steering system of claim 9, further comprising a foot binding coupled to the foot plate.

* * * * *